United States Patent [19]

Silberberg

[11] 4,360,636
[45] Nov. 23, 1982

[54] BLENDS OF A SULFONE POLYMER AND IMPACT RESISTANT INTERPOLYMER

[75] Inventor: Joseph Silberberg, Brooklyn, N.Y.

[73] Assignee: Stauffer Chemical Company, Westport, Conn.

[21] Appl. No.: 287,389

[22] Filed: Jul. 27, 1981

[51] Int. Cl.$^3$ .................. C08L 51/00; C08L 81/06
[52] U.S. Cl. ................................ 525/64; 525/68; 525/902
[58] Field of Search ................ 525/64, 68, 902

[56] References Cited

U.S. PATENT DOCUMENTS

| 3,655,826 | 4/1972 | Fellmann et al. | 260/876 R |
| 4,148,842 | 4/1979 | Yu et al. | 260/873 |
| 4,168,285 | 9/1979 | Turczyic | 525/82 |

*Primary Examiner*—Carman J. Seccuro
*Attorney, Agent, or Firm*—Richard P. Fennelly

[57] ABSTRACT

Blends of a sulfone polymer, such as polysulfone, polyethersulfone, or polyphenylsulfone, and an impact resistant interpolymer comprising crosslinked acrylic or methacrylic rubber, crosslinked styrene-acrylonitrile, and uncrosslinked styrene-acrylonitrile polymer components are disclosed.

7 Claims, No Drawings

BLENDS OF A SULFONE POLYMER AND IMPACT RESISTANT INTERPOLYMER

BACKGROUND OF THE INVENTION

1. Field of the Invention

The present invention relates to blends of a sulfone polymer, such as polysulfone, polyether sulfone, or polyphenyl sulfone, and an impact resistant interpolymer. The resulting blends find utility as a raw material in the fabrication of formed parts.

2. Description of the Prior Art

Sulfone polymers are transparent high-temperature engineering thermoplastics. Three polymers of this type, which are commercially available, are polysulfone, polyether sulfone, and polyphenyl sulfone.

Blends of sulfone polymers and acrylonitrile-butadiene-styrene resins have been described in the prior art. For example, British Pat. No. 1,306,463 describes blends of a polysulfone resin and an ABS resin which have good flow properties, a very high heat distortion temperature, good impact resistance and flexural strength. U.S. Pat. No. 3,642,946 to T. S. Grabowski describes ternary blends of ABS graft polymer, polycarbonate and polysulfone having high impact strength and high heat distortion temperatures.

Blends of sulfone polymer and a three-stage acrylate/styrene-acrylonitrile composition are suggested by U.S. Pat. No. 3,655,826 to R. P. Fellmann et al. However, this patent at Col. 5, lines 65-70 also suggests that for certain types of polymers, if good impact strength is desired, the third stage should be derived from acrylate or methacrylate monomers, rather than from styrene and acrylonitrile, which is indicated as being responsible for good heat distortion temperature characteristics for the blend (Col. 5, lines 62-65).

Another three-stage interpolymer comprising acrylate, styrene, and acrylonitrile moieties is described in U.S. Pat. No. 3,944,631 to A. J. Yu et al. This interpolymer has been rather specifically described in the prior art as an impact improvement additive for polycarbonate resins (U.S. Pat. No. 4,148,842), for blends of chlorinated vinyl chloride and vinyl chloride polymers (U.S. Pat. No. 4,160,793), and for vinyl chloride polymers (U.S. Pat. No. 4,168,285). It has not previously been shown or suggested as an impact improvement additive for sulfone polymers.

SUMMARY OF THE PRESENT INVENTION

The present invention relates to blends of (1) a sulfone polymer; and (2) an impact resistant interpolymer comprising crosslinked (meth)acrylate, crosslinked styrene-acrylonitrile, and uncrosslinked styrene-acrylonitrile polymeric components. The interpolymer acts as an impact resistance improver in the blend.

DESCRIPTION OF PREFERRED EMBODIMENTS

The blends of the present invention comprise: (1) a sulfone polymer; and (2) an impact resistant interpolymer comprising crosslinked (meth)acrylate, crosslinked styrene-acrylonitrile, and uncrosslinked styrene-acrylonitrile polymeric components.

The term "sulfone polymer", as used herein, is intended to encompass those sulfone polymers featuring the sulfone group. Such materials are well known and are described at a number of places including: U.S. Pat. No. 3,642,946; Modern Plastics Encyclopedia, 1977-78, pp. 108, 110-11 and 112; Kirk-Othmer Encyclopedia of Chemical Technology, Second Edition, Vol. 16, pp. 272-281 (1968); and Handbook of Plastics and Elastomers, C. A. Harper, ed., McGraw-Hill, Inc., 1975 pp. 1-69 and 1-95 to 96. Representative polymers of this type include polysulfone, polyether sulfone, and polyphenyl sulfone. Commercially available sulfone polymers include those sold under the following trademarks: UDEL (Union Carbide Corp.) and VICTREX (ICI Americas, Inc.). The sulfone polymer that is selected for use in the present invention can contain any of the additives conventionally used in such resins including fillers, plasticizers, lubricants, antioxidants, etc.

The terminology "impact resistant interpolymer comprising crosslinked (meth)acrylate, crosslinked styrene-acrylonitrile and uncrosslinked styrene-acrylonitrile components" is meant to encompass the type of interpolymer compositions described in U.S. Pat. No. 3,944,631 to A. J. Yu et al. These interpolymer compositions are formed by the following type of three-step, sequential polymerization process:

1. emulsion polymerizing a monomer charge (herein designated "(meth)acrylate", for the purposes of the present invention), of at least one $C_2$-$C_{10}$ alkyl acrylate, $C_8$-$C_{22}$ alkyl acrylate, $C_8$-$C_{22}$ alkyl methacrylate or compatible mixtures thereof, in an aqueous polymerization medium in the presence of an effective amount of a suitable di- or polyethylenically unsaturated crosslinking agent for such a type of monomer, with the $C_4$-$C_8$ alkyl acrylates being the preferred (meth)acrylate monomers for use in this step;

2. emulsion polymerizing a monomer charge of styrene and acrylonitrile in an aqueous polymerization medium, also in the presence of an effective amount of a suitable di- or polyethylenically unsaturated crosslinking agent for such monomers, said polymerization being carried out in the presence of the product from Step 1 so that the crosslinked (meth)acrylate and crosslinked styrene-acrylonitrile components form an interpolymer wherein the respective phases surround and penetrate one another; and 3. either emulsion or suspension polymerizing a monomer charge of styrene and acrylonitrile, in the absence of a crosslinking agent, in the presence of the product resulting from Step 2. If desired, Steps 1 and 2 can be reversed in the above-described procedure.

This product, which is used as the impact resistant interpolymer component in the blends of the present invention generally comprises from about 5% to about 50%, by weight, of the above-identified crosslinked (meth)acrylate component, from about 5% to about 35%, by weight, of the crosslinked styrene-acrylonitrile component and from about 15% to about 90%, by weight, of the uncrosslinked styrene-acrylonitrile component. It contains little graft polymerization between the styrene-acrylonitrile copolymer components and the crosslinked (meth)acrylate polymeric component. Further details regarding this type of polymer composition can be found in U.S. Pat. No. 3,944,631 to A. J. Yu et al., which is incorporated herein by reference.

The blends of the present invention can be formulated in weight ratios of sulfone polymer to interpolymer additive of from about 95:5 to about 50:50, for example, depending upon the precise physical properties desired in the end product.

Blending can be achieved by any of the well-known polymer blending techniques, such as two-roll or Banbury mixing, single or multiple screw extrusion, or any other method which applies sufficient heat (e.g., 230° to 400° C., preferably 260° to 340° C.) and shear to the respective polymeric ingredients (sulfone polymer and interpolymer additive) to obtain a satisfactory blend in accordance with the present invention. Thorough low shear mixing favors the highest degree of impact strength development.

The present invention is further illustrated by the Examples which follow.

EXAMPLES 1-5

These Examples illustrate various blends of polysulfone resin (UDEL brand from Union Carbide) and the type of crosslinked acrylate/crosslinked styrene-acrylonitrile/uncrosslinked styrene-acrylonitrile (SAN) interpolymer described in U.S. Pat. No. 3,944,631 to A. J. Yu et al. The interpolymer comprised 32% acrylate, 10% crosslinked SAN, and 58% uncrosslinked SAN.

The blends described in the Table given below were formed by the following procedure:

The selected ingredients were first oven dried at 120° C. for 4 hours. The samples that were selected for fabrication had the respective weight amounts of polysulfone and interpolymer extrusion compounded at 274° C. in an extrusion apparatus having a 2.5 cm. barrel diameter, a 20/1 length to diameter ratio, with a 2:1 compression ratio standard taper screw turning at 50 rpm, through a strand die. The extruded samples were then dried overnight at 90° C. and were formed into test plaques by injection molding at 274° C. The Table sets forth the physical properties of the injection molded samples:

TABLE

| Example | % Interpolymer | (%) Polysulfone | Tensile Yield Strength[1] (MPa) | Ultimate Elongation[1] (%) |
|---|---|---|---|---|
| 1 (Control) | 100 | 0 | 38.6 | 30 |
| 2 | 75 | 25 | 47.7 | 9 |
| 3 | 50 | 50 | 55.7 | 9 |
| 4 | 25 | 75 | 63.7 | 10 |
| 5 (Control) | 0 | 100 | 70.3 | 50-100 |

| Example | Flexural Modulus[2] (GPa) | Izod Impact[3] (J/m) |
|---|---|---|
| 1 (Control) | 1.65 | 262 (D) |
| 2 | 1.96 | 374 (D) |
| 3 | 2.13 | 956 (D) |
| 4 | 2.35 | 117 (B) |
| 5 (Control) | 2.69 | 69 (B) |

| Example | Tensile Impact[4] (KJ/m²) | DTL[5] (°C.) |
|---|---|---|
| 1 (Control) | 357 | 85 |
| 2 | 143 | 93 |
| 3 | 758 | 106 |
| 4 | 803 | >150 |
| 5 (Control) | 420 | 174 |

[1]ASTM D-638 using 0.32 × 0.32 cm. cross-section plaques with a gauge length of 1.42 cm.
[2]ASTM D-790, Method I, Procedure B
[3]ASTM D-256, Method A, Using a 0.32 cm. thick specimen."D" indicates ductile breaks, "B", brittle breaks.
[4]ASTM D-1822, Specimen Type L
[5]ASTM D-648, measured at 1.82 MPa on the 0.32 cm. specimen These data illustrate that tensile yield strength and flexural modulus characteristics vary in a roughly linear fashion. Elongation, tensile modulus, and impact resistance show greater variation. The heat deflection temperature (DTL) shows a large increase between 50% and 75% polysulfone. A certain degree of inhomogeneity was indicated in certain tested specimens by evidence of lamination in fractured specimens and variation in test data in specimen-to-specimen tests. Some inhomogeneity is usually desirable for high impact, two phase polymer systems.

EXAMPLES 6-9

These Examples illustrate the effect of the extrusion temperature on certain physical property characteristics of a polysulfone/interpolymer blend at a 50:50 weight ratio. The interpolymer was the same that was employed in Examples 1-5 and the same general mixing procedures used in Examples 1-5 were employed with the exception that the temperature in the metering section of the extrusion apparatus was changed, as described in the Table below.

TABLE

| Example | Metering Section Temp. (°C.) | DTL (°C.) | Izod Impact (J/m) | Flexural Modulus (GPa) |
|---|---|---|---|---|
| 6 | 232 | 102 | 101 (B) | 2.14 |
| 7 | 246 | 103 | 208 (B) | 2.12 |
| 8 | 260 | 102 | 123 (B) | 2.09 |
| 9 | 274 | 104 | 262 (B) | 2.05 |

The impact strength of the blends tended to increase somewhat with increasing processing temperatures in the tested range (232° C. to 274° C.).

EXAMPLES 10-14

These Examples illustrate the effect of successive extrusions of a 50:50 blend of polysulfone and interpolymer at 274° C. The interpolymer comprised 32% crosslinked acrylate, 10% crosslinked SAN, and 58% uncrosslinked SAN.

TABLE

| Example | No. of Successive Extrusions (at 274° C.) | DTL (°C.) | Izod Impact (J/m) | Flex. Mod. (GPa) |
|---|---|---|---|---|
| 10 | 1 | 104 | 133 (B) | 2.00 |
| 11 | 2 | 104 | 112 (B) | 2.06 |
| 12 | 3 | 104 | 80 (B) | 1.96 |
| 13 | 4 | 104 | 91 (B) | 2.05 |
| 14 | 5 | 104 | 96 (B) | 2.11 |

The effect of successive extrusion runs on the properties of the blend was judged to be minor.

EXAMPLES 15-24

These Examples illustrate further blends of sulfone polymer and the interpolymer of U.S. Pat. No. 3,944,631 to A. J. Yu et al.

The samples given below were formed in a single stage extrusion apparatus at 260° C.-288° C. having a 2.5 cm. barrel diameter, a 3:1 compression ratio standard taper screw turning at 50 rpm through a strand die:

| | (Wt. %) | |
|---|---|---|
| Example No. | Sulfone Polymer | Interpolymer |
| 15 | 100 | 0 |
| 16 | 95 | 5 |
| 17 | 90 | 10 |
| 18 | 85 | 15 |
| 19 | 75 | 25 |

-continued

| Example No. | Sulfone Polymer (Wt. %) | Interpolymer (Wt. %) |
|---|---|---|
| 20 | 65 | 35 |
| 21 | 55 | 45 |
| 22 | 45 | 55 |
| 23 | 25 | 75 |
| 24 | 0 | 100 |

Test samples were produced by injection molding using an injection pressure of 70.3–105.5 kg/cm², a holding pressure of 35.2 kg/cm², and a holding time of 6 seconds. The temperature conditions (°C.) were as follows:

| Example No. | Rear of Barrel | Front of Barrel | Nozzle | Mold |
|---|---|---|---|---|
| 15 | 250 | 335 | 335 | 200 |
| 16 | 250 | 310 | 310 | 230 |
| 17 | 250* | 330* | 330* | 200* |
| 18 | 250 | 300 | 300 | 175 |
| 19–21 | 250 | 265 | 265 | 150 |
| 22–24 | 215 | 230 | 230 | 125 |

*decomposition noted by observing the odor and burning produced.

The melt rheology of the samples was then determined:

| Example No. | Temp. (°C.) | Melt Viscosity (Poise) 100 sec$^{-1}$ | Melt Viscosity (Poise) 1000 sec$^{-1}$ |
|---|---|---|---|
| 15 | 310 | 27,000 | 9000 |
| 16 | 310 | 16,000 | 5000 |
| 17 | 310 | 12,000 | 3500 |
| 18 | 310 | 12,000 | 3000 |
| 19 | 310 | 10,000 | 2200 |
|  | 260 | 21,000 | 5200 |
| 20 | 310 | 9,000 | 2000 |
|  | 260 | 19,000 | 4700 |
| 21 | 310 | 7,700 | 1700 |
|  | 260 | 16,000 | 4000 |
| 22 | 260 | 13,000 | 3200 |
| 23 | 260 | 11,000 | 2600 |
| 24 | 260 | 11,000 | 2400 |

The remaining physical properties determined for the samples were as follows:

| Example No. | Tensile Str. (MPa) | Tensile Mod.[1] (GPa) | Ultimate Elong. (%) |
|---|---|---|---|
| 15 | 72.7 | 1.26 | 85 |
| 16 | 70.7 | 1.23 | 45 |
| 17* | — | — | — |
| 18 | 58.5 | 1.22 | 10 |
| 19 | 52.3 | 1.17 | 7 |
| 20 | 54.1 | 1.12 | 9 |
| 21 | 49.6 | 1.10 | 12 |
| 22 | 45.2 | 1.09 | 18 |
| 23 | 38.1 | 1.00 | 25 |
| 24 | 29.1 | 0.88 | 14 |

| Example No. | Flex. Str. (MPa) | Flex. Mod. (GPa) |
|---|---|---|
| 15 | 116.5 | 2.54 |
| 16 | 113.1 | 2.56 |
| 17* | — | — |
| 18 | 84.5 | 2.45 |
| 19 | 81.2 | 2.37 |
| 20 | 86.3 | 2.23 |
| 21 | 84.0 | 2.19 |
| 22 | 73.9 | 2.05 |
| 23 | 63.9 | 1.85 |
| 24 | 49.1 | 1.59 |

| Example No. | Izod Impact (J/m) | DLT (°C.) |
|---|---|---|
| 15 | 59 (B) | 165 |
| 16 | 75 (B) | 160 |
| 17* | — | — |
| 18 | 149 (B) | 151 |
| 19 | 203 (D) | 148 |
| 20 | 203 (D) | 134 |
| 21 | 219 (D) | 110 |
| 22 | 85 (B) | 92 |
| 23 | 139 (B) | 83 |
| 24 | 390 (D) | 74 |

*decomposed. No data determined for the sample.
[1] values are low because an extensometer was not used to measure increase in gage length of the sample. However, the values are in the proper order.

These data illustrate a number of trends for the tested compositions. The Izod impact values are at a maximum at from about 10–50 wt.% interpolymer. There is a large decrease in the melt viscosity of the blends at as little as 5 wt.% of interpolymer, however, this decrease levels off at levels of above 50 wt.% interpolymer. Elevated DTL readings were retained at up to 35 wt.% interpolymer whereas at levels of interpolymer over 35 wt.% they dropped.

Preferred blends would be those containing 10–50 wt.% interpolymer, with the most preferred at about 15–25 wt.% interpolymer.

The foregoing Examples set forth certain embodiments of the present invention but should not be construed in a limiting manner. The scope of protection for the present invention is set forth in the claims which follow.

What is claimed:

1. A blend comprising: (1) a sulfone polymer and (2) an impact improving amount of an impact resistant interpolymer comprising as the polymeric components crosslinked (meth)acrylate as the first stage, crosslinked styrene-acrylonitrile as the second stage, and uncrosslinked styrene-acrylonitrile as the third stage.

2. A blend as claimed in claim 1 wherein the interpolymer comprises from about 5% to about 50%, by weight, of the (meth)acrylate component, from about 5% to about 35%, by weight, of the crosslinked styrene-acrylonitrile component, and from about 15% to about 90%, by weight, of the uncrosslinked styrene-acrylonitrile component.

3. A blend as claimed in claim 1 or 2 which comprises a weight ratio of sulfone polymer to interpolymer of from about 95:5 to about 50:50.

4. A blend as claimed in either claim 1 or 2 wherein the (meth)acrylate component of the interpolymer is selected from the group consisting of the crosslinked $C_2$–$C_{10}$ alkyl acrylates, the crosslinked $C_8$–$C_{22}$ alkyl methacrylates, and compatible mixtures thereof.

5. A blend as claimed in either claim 1 or 2 wherein the (meth)acrylate component of the interpolymer is a crosslinked $C_4$–$C_8$ alkyl acrylate.

6. A blend as claimed in either claim 1 or 2 wherein the sulfone polymer is polysulfone.

7. A blend as claimed in either claim 1 or 2 wherein the weight ratio of sulfone polymer to interpolymer is from about 95:5 to about 50:50 and the interpolymer comprises from about 5% to about 50% by weight, of a crosslinked polybutyl acrylate component, from about 5% to about 35%, by weight, of the crosslinked styrene-acrylonitrile component, and from about 15% to about 90%, by weight, of the uncrosslinked styrene-acrylonitrile component.

* * * * *